United States Patent
Saha et al.

(10) Patent No.: US 12,555,002 B2
(45) Date of Patent: Feb. 17, 2026

(54) RULE GENERATION FOR MACHINE-LEARNING MODEL DISCRIMINATORY REGIONS

(71) Applicant: International Business Machines Corporation, Armonk, NY (US)

(72) Inventors: Diptikalyan Saha, Bangalore (IN); Swagatam Haldar, Kolkata (IN); Swastik Haldar, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1088 days.

(21) Appl. No.: 17/509,582

(22) Filed: Oct. 25, 2021

(65) Prior Publication Data

US 2023/0125963 A1  Apr. 27, 2023

(51) Int. Cl.
*G06N 5/01* (2023.01)
*G06N 5/025* (2023.01)

(52) U.S. Cl.
CPC .............. *G06N 5/025* (2013.01); *G06N 5/01* (2023.01)

(58) Field of Classification Search
CPC ................................ G06N 5/025; G06N 5/01
See application file for complete search history.

(56) References Cited

U.S. PATENT DOCUMENTS

| | | | |
|---|---|---|---|
| 9,276,904 B2 | 3/2016 | Bansal et al. | |
| 9,628,444 B1 | 4/2017 | Glazemakers et al. | |
| 11,568,301 B1 * | 1/2023 | Yueh | G06N 20/00 |
| 2019/0342346 A1 | 11/2019 | Jain et al. | |
| 2020/0228372 A1 | 7/2020 | Ore et al. | |

OTHER PUBLICATIONS

Sato, M., et al, Rule Extraction from Neural Networks via Decision Tree Induction, [received Dec. 11, 2024]. Retrieved from Internet :<https://ieeexplore.ieee.org/abstract/document/938448?casa_token=6eTbMA2DnmIAAAAA:PE5ongdAs5Xf3LhnBwK6sRe2U0Nz1MNQZthcXr9pBEI5wqHZiMRmRwv89XEeGSnYFFDGA74Q> (Year: 2000).*

(Continued)

*Primary Examiner* — Miranda M Huang
*Assistant Examiner* — Bart I Rylander
(74) *Attorney, Agent, or Firm* — Rakesh Roy (57) ABSTRACT

One embodiment provides a method, including: providing, from the central server to a machine-learning model, a training set of samples having known values for at least one target protected attribute, wherein the training set includes a first set of samples having a first value for the at least one target protected attribute and a second set of samples having a second value for the at least one target protected attribute; receiving, at the central server from the machine-learning model, an output classification for each of the samples within the training set of samples; and generating, at the central server using the output classification, a set of rules delineating a region within the machine-learning model as discriminatory, wherein the region includes a classification region where the machine-learning model classifies received samples differently based upon a value of the at least one protected attribute.

20 Claims, 3 Drawing Sheets

(56) References Cited

OTHER PUBLICATIONS

Wang, Q., et al, Visual analysis of discrimination in machine learning, [received Nov. 21, 2024]. Retrieved from Internet: <https://ieeexplore.ieee.org/abstract/document/9222272?casa_token=82FqomK88qlAAAAA: 1kTnly3Y7Vx47ymTwSK7GyTjpQbUBncsk6i6zqIW4w9XipQEMSEXnDI01Hy5c_A4vDaunm9X> (Year: 2020).*

Aghaei. S., et al., Learning Optimal and Fair Decision Trees for Non-Discriminative Decision-Making, [received Dec. 11, 2024]. Retrieved from Internet: <https://ojs.aaai.org/index.php/AAAI/article/view/3943> (Year: 2019).*

Ahn, Y., et al., FairSight: Visual Analytics for Fairness in Decision Making, [received Dec. 11, 2024]. Retrieved from Internet: < https://ieeexplore.ieee.org/abstract/document/8805420?casa_token=DWKD-9dg5ikAAAAA:eFVskheLbWvm-3JCUcsoNTblX5PYkeFCA4NeBITgJbUyNSRtEcjZdks9VY_KbzzeyWrVgSd4> (Year: 2019).*

Ming, Y., et al, RuleMatrix: Visualizing and Understanding Classifiers with Rules, [received Dec. 11, 2024]. Retrieved from Internet :<https://ieeexplore.ieee.org/abstract/document/8440085?casa_token =_ybEjpTK_DQAAAAA: UURGG3Tq8zwdxWvxXOQnpcs6IRMeg-ghQueEV5P_ENqRp7ggCQkH4d5hSjvekl1oEoCBj7rx> (Year: 2018).*

Puri, N., et al, MAGIX: Model Agnostic Globally Interpretable Explanations, [received Dec. 11, 2024]. Retrieved from Internet :<https://arxiv.org/abs/1706.07160> (Year: 2018).*

Sato, M., et al, Rule Extraction from Neural Networks via Decision Tree Induction, [received Dec. 11, 2024]. Retrieved from Internet:<https://ieeexplore.ieee.org/abstract/document/938448?casa_token=6eTbMA2DnmlAAAAA: PE5ongdAs5Xf3LhnBwK6sRe2UONz1MNQZthcXr9pBEI5wqHZiMRmRwv89XEeGSnYFFDGA74Q> (Year: 2000).*

Wang, Q., et al, Visual analysis of discrimination in machine learning, [received Nov. 21, 2024]. Retrieved from Internet:<https://ieeexplore.ieee.org/abstract/document/9222272?casa_token=82FqomK88qlAAAAA: 1kTnly3Y7Vx47ymTwSK7GyTjpQbUBncsk6i6zqIW4w9XipQEMSEXnDI01Hy5c_A4vDaunm9X> (Year: 2020).*

Wexler, J., et al, The What-If Tool: Interactive Probing of Machine Learning Models, [received Dec. 11, 2024]. Retrieved from Internet: <https://ieeexplore.ieee.org/abstract/document/8807255> (Year: 2019).*

Urban, C., et al, Perfectly Parallel Fairness Certification of Neural Networks, [received Oct. 16, 2025]. Retrieved from Internet:<Perfectly Parallel Fairness Certification of Neural Networks> (Year: 2020).*

\* cited by examiner

RULE GENERATION FOR MACHINE-LEARNING MODEL DISCRIMINATORY REGIONS

BACKGROUND

Machine-learning models are used to make predictions about and classify samples. The use of a machine-learning model allows for the classification of many samples without the need for a user to manually classify the samples, thereby allowing for a much more efficient classification of samples. In other words, the machine-learning model is able to classify a number of samples that is much more than what a human could classify. Additionally, the machine-learning model provides a technique that allows for a more consistent classification of the samples than using a team of people. Since the machine-learning model makes classification without the intervention of a user, the machine-learning model has to be trained to make accurate classifications. In order to train the machine-learning model, a training dataset is utilized which the machine-learning model can ingest to learn how subsequent samples should be classified. The training dataset allows the machine-learning model to learn and generate boundaries which define how samples should be classified. Samples falling on one side of the boundary will be classified one way, while samples falling on the other side of the boundary will be classified differently.

BRIEF SUMMARY

In summary, one aspect of the invention provides a method, including: accessing, by a central server having access to a plurality of machine-learning models that classify samples, one of the plurality of machine-learning models; providing, from the central server to the one of the plurality of machine-learning models, a training set of samples having known values for at least one target protected attribute, wherein the training set includes a first set of samples having a first value for the at least one target protected attribute and a second set of samples having a second value for the at least one target protected attribute; receiving, at the central server from the one of the plurality of machine-learning models, an output classification for each of the samples within the training set of samples; and generating, at the central server using the output classification, a set of rules delineating a region within the one of the plurality of machine-learning models as discriminatory, wherein the region includes a classification region where the one of the plurality of machine-learning models classifies received samples differently based upon a value of the at least one protected attribute.

Another aspect of the invention provides an apparatus, including: at least one processor; and a computer readable storage medium having computer readable program code embodied therewith and executable by the at least one processor; wherein the computer readable program code is configured to access, by a central server having access to a plurality of machine-learning models that classify samples, one of the plurality of machine-learning models; wherein the computer readable program code is configured to provide, from the central server to the one of the plurality of machine-learning models, a training set of samples having known values for at least one target protected attribute, wherein the training set includes a first set of samples having a first value for the at least one target protected attribute and a second set of samples having a second value for the at least one target protected attribute; wherein the computer readable program code is configured to receive, at the central server from the one of the plurality of machine-learning models, an output classification for each of the samples within the training set of samples; and wherein the computer readable program code is configured to generate, at the central server using the output classification, a set of rules delineating a region within the one of the plurality of machine-learning models as discriminatory, wherein the region includes a classification region where the one of the plurality of machine-learning models classifies received samples differently based upon a value of the at least one protected attribute.

An additional aspect of the invention provides a computer program product, including: a computer readable storage medium having computer readable program code embodied therewith, the computer readable program code executable by a processor; wherein the computer readable program code is configured to access, by a central server having access to a plurality of machine-learning models that classify samples, one of the plurality of machine-learning models; wherein the computer readable program code is configured to provide, from the central server to the one of the plurality of machine-learning models, a training set of samples having known values for at least one target protected attribute, wherein the training set includes a first set of samples having a first value for the at least one target protected attribute and a second set of samples having a second value for the at least one target protected attribute; wherein the computer readable program code is configured to receive, at the central server from the one of the plurality of machine-learning models, an output classification for each of the samples within the training set of samples; and wherein the computer readable program code is configured to generate, at the central server using the output classification, a set of rules delineating a region within the one of the plurality of machine-learning models as discriminatory, wherein the region includes a classification region where the one of the plurality of machine-learning models classifies received samples differently based upon a value of the at least one protected attribute.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIGS. 1-3. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 3. In accordance with an example embodiment, most if not all of the process steps, components and outputs discussed with respect to FIGS. 1-2 can be performed or utilized by way of a processing unit or units and system memory such as those indicated, respectively, at 16' and 28' in FIG. 3, whether on a server computer, a client computer, a node computer in a distributed network, or any combination thereof.

One problem that occurs when training a machine-learning model is that bias can be introduced into the machine-learning model. Bias occurs when the machine-learning model favors one class of samples over another class of samples based upon a value of an attribute. While bias may be acceptable in some applications of the machine-learning model, it is unacceptable in other applications. This is particularly true when the bias is discriminatory. A discriminatory bias means that the machine-learning model classifies two similar samples differently except for a change in a value of a protected attribute. A protected attribute is an attribute of the sample that is specifically identified as an attribute that cannot change a classification made by the model. In other words, a protected attribute is an attribute that should not influence a classification by the machine-learning model. Common protected attributes are those attributes protected by law (e.g., age, ethnicity, gender, etc.). However, other attributes may be considered protected attributes, for example, based upon the application of the model, set by the system or a user, or the like. As an example, for a loan approval application, a user may identify that education is a protected attribute.

If bias is introduced into the training dataset, the machine-learning model will learn the bias. The machine-learning model will then incorrectly classify samples based upon the bias within the model. In other words, the machine-learning model will discriminate against a sample based solely on the protected attribute. Traditional techniques have focused on testing a machine-learning model for discrimination. In other words, the traditional techniques focus on identifying if bias exists within the model. If bias exists, traditional techniques may attempt to retrain the model to remove the bias. However, it may be difficult to remove the bias from a machine-learning model. Thus, the machine-learning model may be unusable due to the bias of the machine-learning model.

Accordingly, an embodiment provides a system and method for generating a set of rules delineating a region within a machine-learning model that is discriminatory by testing the machine-learning model utilizing a training set of samples and classifying the output classification generated by the machine-learning model. A central server which is connected to or can access a plurality of machine-learning models, accesses one of the machine-learning models. The central server provides a training set of samples to the machine-learning model. The training set of samples does not need to be labeled. The central server is not interested in the accuracy of the model, which is tested using a labeled set of samples, but is interested in how the model classifies the samples as compared to other samples. Thus, instead of analyzing the machine-learning model against a labeled set of samples, the central server analyzes the machine-learning model against samples having known attribute values. Accordingly, the training set of samples includes a first set of samples which have a first value for a target protected attribute and a second set of samples which have a second value for the target protected attribute.

The central server receives an output classification from the machine-learning model for the training set of samples. Since one set of the training set of samples includes a first value for the protected attribute, and the second set of samples includes a second value for the protected attribute, the central server can analyze the output classification for each of the sets of samples within the training set. In other words, the central server can determine if the classification for two matching samples except for the value change of the protected attribute is the same. If the classification is the same, then the machine-learning model is not discriminatory against that protected attribute with respect to that set of samples. The central server can analyze the output classification and generate a set of rules delineating a region within the machine-learning model that is discriminatory. In other words, the central server can determine if the model is discriminatory and, if so, for what protected attributes and range of protected attributes it is discriminatory. Within the region defined by the set of rules, the machine-learning model is discriminatory, meaning it classifies samples differently based upon a value of the protected attribute.

Such a system provides a technical improvement over current systems for identifying machine-learning model discrimination or bias. Instead of simply identifying that the model is discriminatory, like traditional techniques, the described system and methods are able to identify a region within the machine-learning model that is being discriminatory. The system is able to generate rules around this region, where the rules delineate the region. Instead of attempting to retrain the machine-learning model or determining the model is unusable, the described system instead disallows samples that would fall within the region from being sent to the machine-learning model. This allows the model to continue to be used, but prevents the model from classifying samples in a discriminatory manner because any samples that would be affected by the discriminatory region will not be provided to the model. Thus, the described system provides a technique that reduces discrimination by machine-learning models as compared to traditional techniques.

Figure 1:
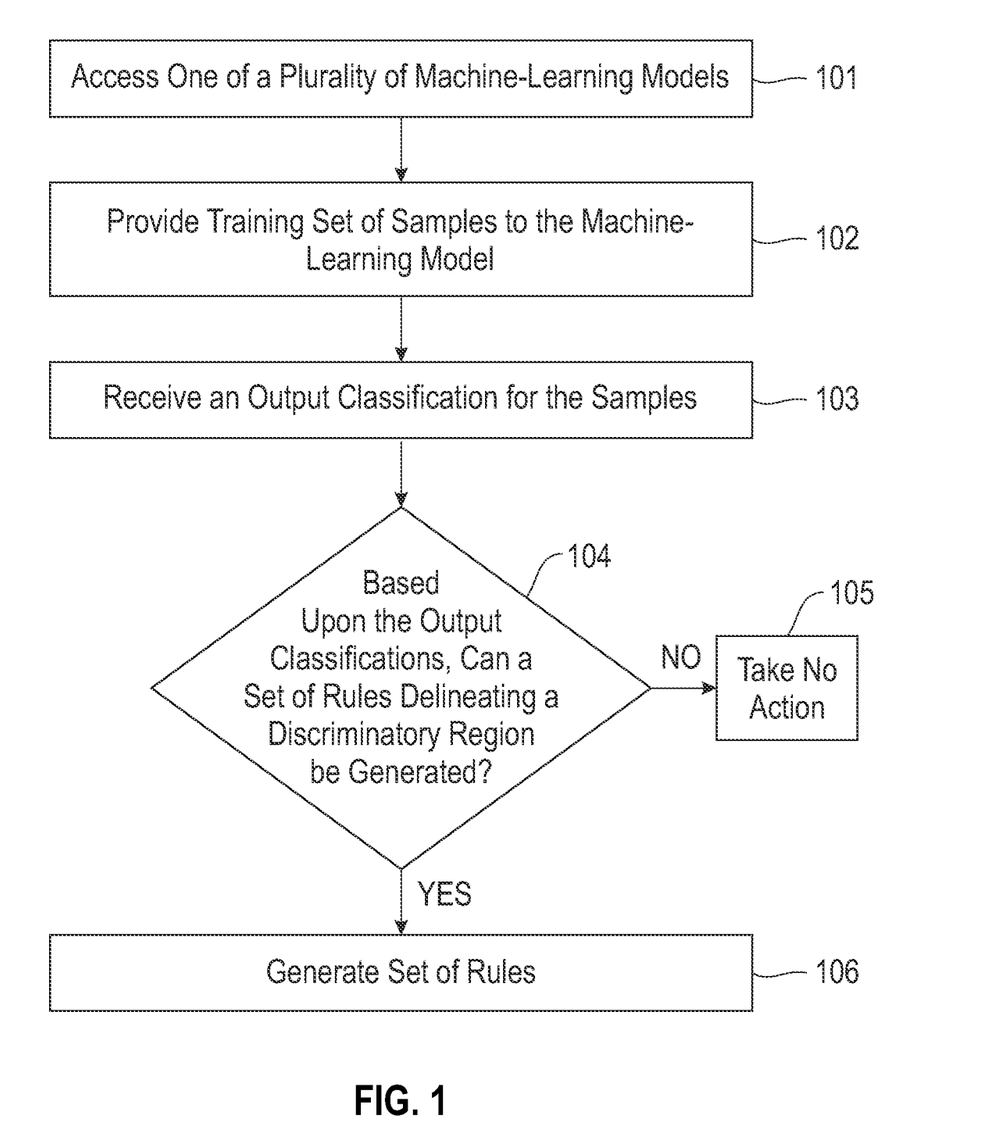
FIG. 1 illustrates a method of generating a set of rules delineating a region within a machine-learning model that is discriminatory by testing the machine-learning model utilizing a training set of samples and classifying the output classification generated by the machine-learning model.

FIG. 1 illustrates a method for generating a set of rules delineating a region within a machine-learning model that is discriminatory by testing the machine-learning model utilizing a training set of samples and classifying the output classification generated by the machine-learning model. A central server has access to a plurality of machine-learning models. For example, the central server may be a component of a cloud computing environment, remote network environment, local network environment, or the like, that is connected to or can communicate with many machine-learning models. Each of the machine-learning models is trained and designed to classify samples, which may include samples having a protected attribute. As mentioned previously, a protected attribute is an attribute that is designated as having no effect on a classification of the sample by the machine-learning model. In other words, the classification of a sample by a machine-learning model should not change just based upon the value of the protected attribute.

At 101, the central server accesses one of a plurality of machine-learning models. Accessing the model includes communicating with the model, whether that is a direct communication with the model or an indirect communication with the model, for example, communication with the model through a platform of the model. Each of the machine-learning models may be located on different platforms, within different data storage locations, or the like. While a single machine-learning model is discussed herein, the described technique can be used for many machine-learning models even including using the same training set of samples for each of the models. However, for ease of readability a single machine-learning model will be discussed herein.

At 102, the central server provides a training set of samples to the target machine-learning model. In this application it does not make a difference whether the training set of samples are labelled. Rather, the central server is interested in how the machine-learning model classifies the samples with respect to the classification of other samples within the training set. Thus, even if the training set of samples is labeled, the central server would not utilize the labels in this application. However, the values for at least one protected attribute are known to the central server. While the described system can analyze the machine-learning model for multiple protected attributes, the description herein will discuss a single protected attribute for ease of readability. However, this is not intended to limit this disclosure in any way to a single protected attribute.

The central server makes a copy of the samples included within the training set. Within this copy, the central server flips or modifies the value for the protected attribute. This will be referred to as a flipped copy. For example, if the value for the protected attribute is 1 in the first set of samples, the central server will change the value for the protected attribute to 0 for the copy set of samples. It should be noted that the value for the protected attribute may be non-binary values. In this case, the central server may make multiple copies each having different values for the protected attribute.

Additionally, or alternatively, the central server may modify the protected attribute so that the response could be a binary response. For example, if the protected attribute was age, the central server may break possible ages into ranges with each of the ranges corresponding to an attribute of the sample. The central server would then mark whichever range included the age attribute of the sample with a 1, and all other range values with a 0. The central server could then make copies of these samples and modify which range was marked as a 1. The description will focus on a protected attribute having a binary value merely for ease of readability. However, this is not intended to limit the disclosure in any way from including non-binary values.

Once the flipped copy is created, the central server combines the flipped copy and the original set of samples into a single set of training samples, referred to as the training set of samples. Thus, the training set of samples will include pairs (or groups in the case of non-binary protected attribute values) of samples that are the same except for the value of the protected attribute. The training set, including both the original set of samples having the original protected attribute value and the flipped copy having the modified protected attribute value, is provided to the machine-learning model.

The machine-learning model ingests the training set and provides an output classification for each of the samples within the training set of samples. The output classification is the label, annotation, or classification for the sample that is predicted by the machine-learning model. The output classification is received from the machine-learning model at the central server at 103. It should be noted that within the output classification is the classification for each of the pairs (or groups) of samples that have the flipped protected attribute value. These can be used by the central server to determine if the machine-learning model is discriminatory against a particular protected attribute and then delineate a region within the machine-learning model as discriminatory.

Accordingly, at 104 the central server determines if a set of rules delineating a discriminatory region within the machine-learning model can be generated. This determination is made using the output classifications. The discriminatory region is a classification region where the machine-learning model classifies samples differently based upon the value of the target protected attribute. In other words, the model classified one of the samples in a pair (or group) of samples one way and classified the other sample in the pair a different way. Since the only difference between the samples in the pairs is the value of the protected attribute, then a different classification by the model of the samples in the pair indicates that the model is discriminatory with respect to this protected attribute.

To assist in generating the rules which delineate the discriminatory region, the central server may employ a decision tree or other analysis technique. While this disclosure will discuss the use of decision trees, other classification or analysis techniques could be used, for example, random forest classifiers, a machine-learning model for classifying the output classifications, the like, and/or a combination thereof. The decision tree attempts to infer the same label as the original model. However, the central server removes the protected attribute from the training set before classifying the output classifications. Thus, for discriminatory samples where the classification is based upon the protected attribute, which is now removed, when the decision tree attempts to classify the sample, it will be unable to distinguish which label with which to classify the sample. The decision tree will then assign these samples to impure paths which will include samples from both the original set of samples and the flipped set of samples.

The impure paths of the decision tree become the rules for delineation of the region. The samples within the leaves of the decision tree delineate the boundaries for the discriminatory region. In other words, samples that are within the leaves of an impure path indicate that the model is discriminatory against the protected attribute corresponding to the sample. Samples that are not included in an impure path correspond to samples having protected attributes that the model is not discriminatory against. Accordingly, based upon the protected attributes and values of those protected attributes, the central server can identify what protected attributes and values of the protected attributes will be discriminated against within the model. The central server can then create rules based upon this identification.

As the decision tree is classifying samples, the sample pool gets smaller and smaller. Thus, the leaves may have few samples making the decision tree less accurate since the leaf is where the boundary of the region is determined. In other words, it becomes difficult for the decision tree to identify the split condition because the decision tree may not have many samples. Accordingly, since the training set does not need to have labels, the central server can generate samples on demand. The generated samples can be samples specific to the leaves. In other words, the central server can generate samples on demand to ensure that there are enough samples near the leaf. This creates a more precise decision tree with more accurate rules to delineate a more accurate discriminatory region.

The generation of samples is not necessary, but does result in more accurate results. The central server may also only generate samples if the number of samples within a leaf are less than a sample number threshold. In other words, the central server may determine that samples should be generated on demand if a particular leaf does not have enough samples. The generated samples may be specifically directed to a particular leaf In other words, the generated samples may be created such that the resulting classification output by the model will be classified by the decision tree into the target leaf.

If, at 104, the central server cannot generate a set of rules, the central server may take no action at 105. A set of rules may not be able to be generated if the machine-learning model does not have a discriminatory region at all. Alternatively, the model may not have a discriminatory region with respect to the target protected attribute. In other words, while the model may have a discriminatory region, it is not based upon the protected attribute that was modified within the training set.

On the other hand, if the central server can generate a set of rules at 104, the central server may generate the set of rules at 106. The set of rules that are generated define the discriminatory region within the machine-learning model. Thus, the set of rules provide a range of protected attribute values that would result in discrimination by the model. Since the described system can be utilized for multiple protected attribute analyses, the set of rules may identify ranges or values for multiple protected attributes.

The rules are generated for each, individual machine-learning model. Thus, the rules are unique for each machine-learning model. However, the central server may identify that multiple machine-learning models have the same set of rules or subset of the rules. In this case, the central server may make one or more global rules that are applicable to more than one machine-learning model. One difference between a unique model rule and a global rule may be where the rule is tested. For example, for a unique model rule, a sample may be tested against the rule at the model. For a global rule, on the other hand, a sample may be tested against the rule at the central server. This example is not limiting to the location of the testing of rules as different applications may require rule testing in different locations.

Once the rules are created a payload sample may be received at the central server. The payload sample is a set of samples that are to be classified using one or more of the machine-learning models. These are samples that have not previously been seen by the central server or the machine-learning models. Upon receipt of the payload samples, the central server may analyze the set of samples against the rules. This analysis may include testing the samples against the rules at the central server or may include sending the samples to the machine-learning model so that the model can analyze the samples against the rules stored at or with the model. If the samples do not include a protected attribute of values of a protected attribute that fall within the discriminatory region, the samples will be accepted at the model, meaning the samples will be classified by the model.

If, on the other hand, the samples include a protected attribute or values of a protected attribute that fall within the discriminatory region, the samples will be rejected at that machine-learning model. The samples may then be sent to another of the models. At the other model, the samples will be analyzed against the rules for that model, resulting in either acceptance or rejection of the samples at the other model. The user may be notified of a rejection of samples at a model. The notification may also include an explanation identifying at least one reason that the samples were rejected. For example, the explanation may identify which protected attribute or values of a protected attribute are causing the samples to be rejected at the machine-learning model. The user may, upon notification of the rejection of a set of samples, override the rejection. In other words, the user may provide an instruction to override the rejection and the set of samples may then be sent to the model that initially rejected the samples.

Figure 2:
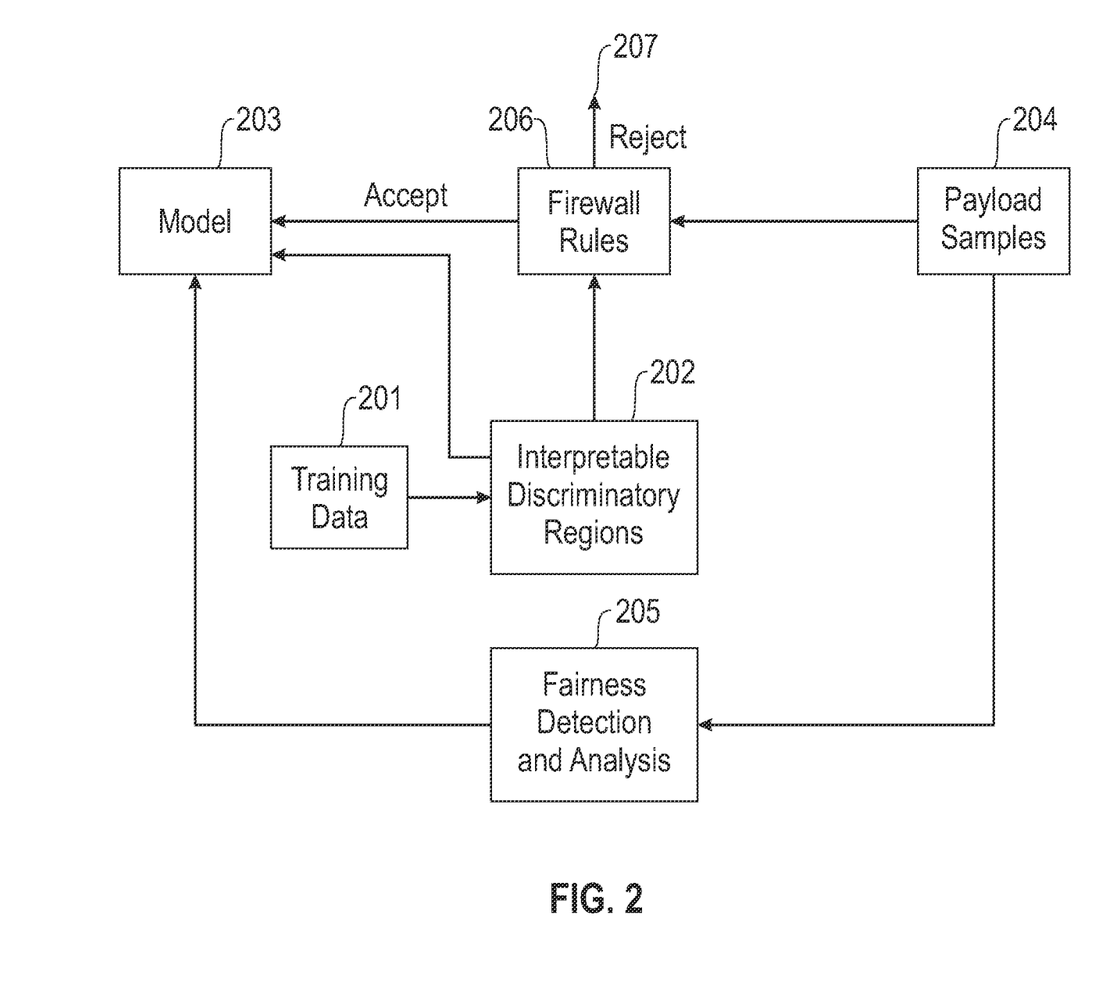
FIG. 2 illustrates an example overall system architecture for generating a set of rules delineating a region within a machine-learning model that is discriminatory by testing the machine-learning model utilizing a training set of samples and classifying the output classification generated by the machine-learning model.

FIG. 2 illustrates an overall system architecture of the described system. The system may use training data 201 to identify interpretable discriminatory regions 202 within a machine-learning model 203. From the interpretable discriminatory regions 202 the system generates firewall rules 206 that delineate the regions. Upon receipt of a set of payload samples 204, the samples 204 are sent to a fairness detection and analysis module 205 that analyzes the samples for fairness. The samples 204 are sent to the model 203 which analyzes the samples 204 against the firewall rules 206. If the rules 206 do not indicate that the samples 204 include a protected attribute or values of a protected attribute that the model 203 is discriminatory against, the samples 204 are accepted at the model 203. If, on the other hand, the samples 204 include a protected attribute or values of a protected that the model 203 is discriminatory against, the samples 204 are rejected 207.

Figure 3:
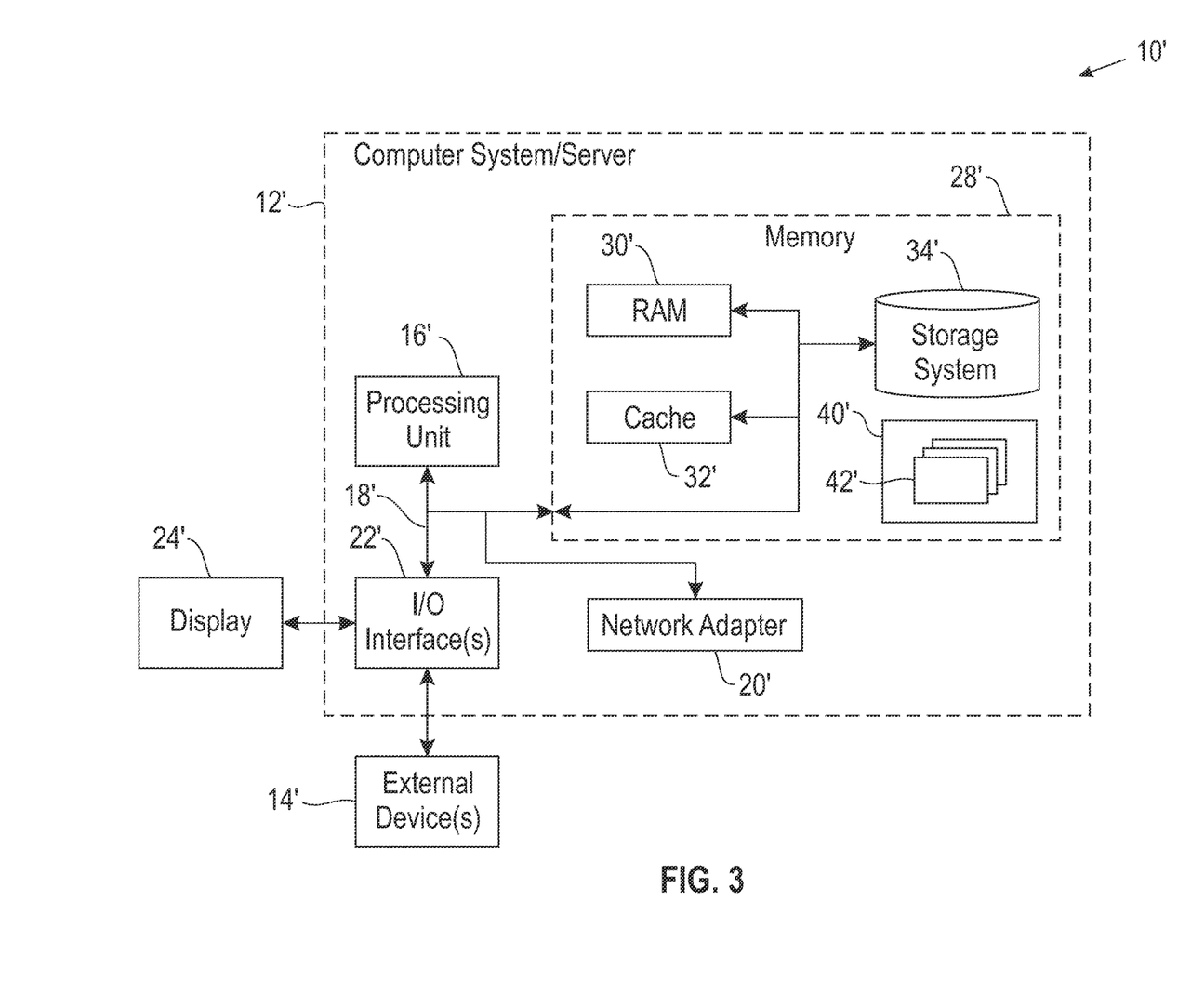
FIG. 3 illustrates a computer system.

As shown in FIG. 3, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:

accessing, by a central server having access to a plurality of machine-learning models that classify samples, one of the plurality of machine-learning models;

providing, from the central server to the one of the plurality of machine-learning models, a training set of samples having known values for at least one target protected attribute, wherein the at least one target protected attribute is identified as an attribute that cannot change a model classification, wherein the training set of samples comprises a first set of samples having a first value for the at least one target protected attribute and a second set of samples having a second value for the at least one target protected attribute, and wherein the first set of samples and the second set of samples are matching samples except for a difference between the first value and the second value for the at least one target protected attribute;

receiving, at the central server from the one of the plurality of machine-learning models, respective output classifications for the first set of samples and the second set of samples, wherein the respective output classifications are different; and delineating, at the central server using the respective output classifications, a discriminatory region within the one of the plurality of machine-learning models, wherein the discriminatory region comprises a range of values of the at least one target protected attribute that cause the respective output classifications of the first set of samples and the second set of samples to be different; and implementing the discriminatory region as a firewall that performs a pre-classification check of an unseen sample to disallow the unseen sample from being sent to the one of the plurality of machine-learning models responsive to the unseen sample including the at least one target protected attribute, wherein the firewall enables continued use of the one of the plurality of machine-learning models while preventing the one of the plurality of machine-learning models from outputting discriminatory classifications.

2. The method of claim 1, wherein the delineating the discriminatory region further comprises removing the at least one target protected attribute from the first set of samples and the second set of samples and executing a decision tree classifier utilizing the respective output classifications to identify discriminatory samples that were classified based on the at least one target protected attribute, wherein the discriminatory samples are assigned to an impure path within a decision tree, and wherein the impure path defines a set of rules delineating a boundary of the discriminatory region.

3. The method of claim 2, further comprising: generating additional samples to be included in the training set of samples, wherein the additional samples comprise one or more samples near the boundary of the discriminatory region.

4. The method of claim 2, wherein the set of rules are unique for each of the plurality of machine-learning models.

5. The method of claim 2, wherein the set of rules further comprises at least a subset of global rules, wherein the subset of global rules comprises rules applicable to more than one of the plurality of machine-learning models.

6. The method of claim 1, further comprising:
receiving a set of samples for classification at the one of the plurality of machine-learning models;
analyzing the set of samples against the discriminatory region; and
based upon the analyzing and responsive to determining the set of samples include the at least one target protected attribute falling within the discriminatory region, rejecting the set of samples at the one of the plurality of machine-learning models.

7. The method of claim 6, further comprising:
sending the set of samples rejected at the one of the plurality of machine-learning models to another of the plurality of machine-learning models.

8. The method of claim 6, wherein the rejecting the set of samples at the one of the plurality of machine-learning models further comprises providing, to a user, an explanation identifying at least one reason for rejecting the set of samples.

9. The method of claim 6, further comprising:
receiving an override instruction from a user and, based upon the override instruction, sending the set of samples to the one of the plurality of machine-learning models.

10. The method of claim 1, further comprising:
receiving a set of samples for classification at the one of the plurality of machine-learning models;
analyzing the set of samples against the discriminatory region; and
based upon the analyzing and responsive to determining the set of samples do not include the at least one target protected attribute falling within the discriminatory region, accepting the set of samples at the one of the plurality of machine-learning models.

11. A computer system, comprising:
at least one processor; and
a computer readable storage medium having computer readable program code embodied therewith and executable by the at least one processor;
wherein the computer readable program code is configured to access, by a central server having access to a plurality of machine-learning models that classify samples, one of the plurality of machine-learning models;
wherein the computer readable program code is configured to provide, from the central server to the one of the plurality of machine-learning models, a training set of samples having known values for at least one target protected attribute, wherein the at least one target protected attribute is identified as an attribute that cannot change a model classification, wherein the training set of samples comprises a first set of samples having a first value for the at least one target protected attribute and a second set of samples having a second value for the at least one target protected attribute, and wherein the first set of samples and the second set of samples are matching samples except for a difference between the first value and the second value for the at least one target protected attribute;
wherein the computer readable program code is configured to receive, at the central server from the one of the plurality of machine-learning models, respective output classifications for the first set of samples and the second set of samples, wherein the respective output classifications are different; and
wherein the computer readable program code is configured to delineate, at the central server using the respective output classifications, a discriminatory region within the one of the plurality of machine-learning models, wherein the discriminatory region comprises a range of values of the at least one target protected attribute that cause the respective output classifications of the first set of samples and the second set of samples to be different; and
wherein the computer readable program code is configured to implement the discriminatory region as a firewall that performs a pre-classification check of an unseen sample to disallow the unseen sample from being sent to the one of the plurality of machine-learning models responsive to the unseen sample including the at least one target protected attribute, wherein the firewall enables continued use of the one of the plurality of machine-learning models while preventing the one of the plurality of machine-learning models from outputting discriminatory classifications.

12. A computer program product, comprising:
a computer readable storage medium having computer readable program code embodied therewith, the computer readable program code executable by a processor;
wherein the computer readable program code is configured to access, by a central server having access to a plurality of machine-learning models that classify samples, one of the plurality of machine-learning models;
wherein the computer readable program code is configured to provide, from the central server to the one of the plurality of machine-learning models, a training set of samples having known values for at least one target protected attribute, wherein the at least one target protected attribute is identified as an attribute that cannot change a model classification, wherein the training set of samples comprises a first set of samples having a first value for the at least one target protected attribute and a second set of samples having a second value for the at least one target protected attribute, and wherein the first set of samples and the second set of samples are matching samples except for a difference between the first value and the second value for the at least one target protected attribute;
wherein the computer readable program code is configured to receive, at the central server from the one of the plurality of machine-learning models, respective output classifications for the first set of samples and the second set of samples, wherein the respective output classifications are different; and wherein the computer readable program code is configured to delineate, at the central server using the respective output classifications, a discriminatory region within the one of the plurality of machine-learning models, wherein the discriminatory region comprises a range of values of the at least one target protected attribute that cause the respective output classifications of the first set of samples and the second set of samples to be different; and wherein the computer readable program code is configured to implement the discriminatory region as a firewall that performs a pre-classification check of an unseen sample to disallow the unseen sample from being sent to the one of the plurality of machine-learning models responsive to the unseen sample including the at least one target protected attribute, wherein the firewall enables continued use of the one of the plurality of machine-learning models while preventing the one of the plurality of machine-learning models from outputting discriminatory classifications.

13. The computer program product of claim 12, wherein the delineating the discriminatory region further comprises removing the at least one target protected attribute from the first set of samples and the second set of samples and executing a decision tree classifier utilizing the respective output classifications to identify discriminatory samples that were classified based on the at least one target protected attribute, wherein the discriminatory samples are assigned to an impure path within a decision tree, and wherein the impure path defines a set of rules.

14. The computer program product of claim 13, further comprising: generating additional samples to be included in the training set of samples, wherein the additional samples comprise one or more samples near a boundary of the discriminatory region.

15. The computer program product of claim 13, wherein the set of rules further comprises at least a subset of global rules, wherein the subset of global rules comprises rules applicable to more than the one of the plurality of machine-learning models.

16. The computer program product of claim 12, further comprising:
receiving a set of samples for classification at the one of the plurality of machine-learning models;
analyzing the set of samples against the discriminatory region; and
based upon the analyzing and responsive to determining the set of samples include the at least one target protected attribute falling within the discriminatory region, rejecting the set of samples at the one of the plurality of machine-learning models.

17. The computer program product of claim 16, further comprising:
sending the set of samples rejected at the one of the plurality of machine-learning models to another of the plurality of machine-learning models.

18. The computer program product of claim 16, wherein the rejecting the set of samples at the one of the plurality of machine-learning models further comprises providing, to a user, an explanation identifying at least one reason for rejecting the set of samples.

19. The computer program product of claim 16, further comprising: receiving an override instruction from a user and, based upon the override instruction, sending the set of samples to the one of the plurality of machine-learning models.

20. The computer program product of claim 12, further comprising:
receiving a set of samples for classification at the one of the plurality of machine-learning models;
analyzing the set of samples against the discriminatory region; and
based upon the analyzing and responsive to determining the set of samples do not include the at least one target protected attribute falling within the discriminatory region, accepting the set of samples at the one of the plurality of machine-learning models.

* * * * *